(12) United States Patent
Miller et al.

(10) Patent No.: US 12,429,179 B2
(45) Date of Patent: Sep. 30, 2025

(54) ILLUMINATED SENSING EDGE ASSEMBLY FOR SWING GATE BARRIER SYSTEM

(71) Applicant: Miller Edge, Inc., West Grove, PA (US)

(72) Inventors: Bearge D. Miller, West Grove, PA (US); Tim Castello, West Chester, PA (US); William J. Duffy, Jr., Christiana, PA (US); Michael A Petruzzo, Chester Springs, PA (US); Kevin Ward, Midlothian, TX (US)

(73) Assignee: MILLER EDGE, INC., West Grove, PA (US)

( * ) Notice: Subject to any disclaimer, the term of this patent is extended or adjusted under 35 U.S.C. 154(b) by 0 days.

(21) Appl. No.: 18/781,423

(22) Filed: Jul. 23, 2024

(65) Prior Publication Data

US 2025/0035274 A1 Jan. 30, 2025

Related U.S. Application Data (60) Provisional application No. 63/528,502, filed on Jul. 24, 2023.

(51) Int. Cl.
*F21S 4/28* (2016.01)
*E01F 9/20* (2016.01)
(Continued)

(52) U.S. Cl.
CPC ............. *F21S 4/28* (2016.01); *E01F 9/20* (2016.02); *F21V 19/002* (2013.01);
(Continued)

(58) Field of Classification Search
CPC .. F21S 4/28; E01F 9/20; F21V 19/002; F21V 23/008; F21Y 2103/10
See application file for complete search history.

(56) References Cited

U.S. PATENT DOCUMENTS

| 5,225,640 A | 7/1993 | Miller et al. |
| 6,470,626 B2 * | 10/2002 | Luetzow ............. E01F 13/06 49/9 |

(Continued)

FOREIGN PATENT DOCUMENTS

| CN | 105332350 B | 7/2017 |
| CN | 111749163 A | 10/2020 |

(Continued)

OTHER PUBLICATIONS

Miller Edge Swing Gate Sensing Edge Monitored 5ft MGO20-K10-2E-05-T2, dowloaded from web page: < https://allsecurityequipment.com/products/miller-edge-mgo20-k10-2e-05-t2? variant=40949620080813¤cy=USD&utm_medium=product_sync &u);> downloaded date Mar. 22, 2024; original posting date unknown; 5 pages.

(Continued)

*Primary Examiner* — Abdulmajeed Aziz
*Assistant Examiner* — Jessica M Apenteng
(74) *Attorney, Agent, or Firm* — Panitch Schwarze Belisario & Nadel LLP (57) ABSTRACT

An illuminated sensing edge assembly has an axially elongate, triple tiered body including a first track, a second track and a third track. The first track is configured to connect with a swing gate barrier arm such that the body underlies the barrier arm when mounted thereto. The second track is constructed of an at least translucent material. An LED strip axially extends through the second channel and is configured to emit light to notify individuals of the barrier arm. A sensing edge underlies the body and is secured to the third track. The sensing edge is configured to elicit a stoppage or reversal of a closing operation of the barrier arm upon a force being applied to the sensing edge.

20 Claims, 9 Drawing Sheets

(51) Int. Cl.
*F21V 19/00* (2006.01)
*F21V 23/00* (2015.01)
*F21Y 103/10* (2016.01)
*F21Y 113/17* (2016.01)
*F21Y 115/10* (2016.01)
*G01L 1/00* (2006.01)

(52) U.S. Cl.
CPC ......... *F21V 23/008* (2013.01); *F21Y 2103/10* (2016.08); *F21Y 2113/17* (2016.08); *F21Y 2115/10* (2016.08); *G01L 1/005* (2013.01)

(56) References Cited

U.S. PATENT DOCUMENTS

| | | | |
|---|---|---|---|
| 6,997,417 B2* | 2/2006 | Zarkades | B61L 29/04 246/127 |
| 7,146,345 B2 | 12/2006 | Weik, III et al. | |
| 7,258,461 B1 | 8/2007 | Izardel | |
| 8,845,125 B1* | 9/2014 | Lumsden | B61L 29/04 362/249.02 |
| 9,157,200 B2 | 10/2015 | Lumsden et al. | |
| 9,809,237 B2 | 11/2017 | DeJarnatt et al. | |
| 2014/0363229 A1* | 12/2014 | Lumsden | B61L 29/24 404/6 |
| 2023/0332766 A1* | 10/2023 | Lumsden | F21S 4/28 |

FOREIGN PATENT DOCUMENTS

| | | |
|---|---|---|
| CN | 113529611 A | 10/2021 |
| CN | 217974162 U | 12/2022 |
| DE | 202023102393 U1 | 6/2023 |
| KR | 101451175 B1 | 10/2014 |
| WO | 2021240561 A1 | 12/2021 |

OTHER PUBLICATIONS

ASO Safety Solutions Sentir Gate Safety Sensing Edge 25-30: Innovative Automated Safety for Enhanced Security; downloaded from webpage: <https://www.northshorecommercialdoor.com/sentir-safety-gate-sensing-edge/?sku=25-30-NM-5&gad_source=1&gclid=CjwKCAiA6KWvBhAREiwAFP); > downloaded Mar. 22, 2024; original posting date unknown; 7 pages.

Safety Edge—Shop Gate Openers; downloaded from the internet <https://shopgateopeners.com/collections/safety-edge;> downloaded Mar. 22, 2024, original posting date unknown; 7 pages.

* cited by examiner

ILLUMINATED SENSING EDGE ASSEMBLY FOR SWING GATE BARRIER SYSTEM

CROSS-REFERENCE TO RELATED APPLICATION

This application claims priority from similarly-titled U.S. Provisional Patent Application No. 63/528,502, filed Jul. 24, 2023, the entire contents of which are incorporated by reference herein.

BACKGROUND OF THE DISCLOSURE

The disclosure relates to a sensing edge assembly, and, more particularly, to an illuminated sensing edge assembly for a swing gate barrier system.

Swing gate barrier systems are universally employed in multiple different settings, generally for the control and regulation of vehicular passage, e.g., ingress, egress or other access, in a safe and lawful manner. For example, swing gate barrier systems are employed in tollbooths, parking garages, residential developments, hotels, shopping malls, commercial offices, airports, railways and the like.

Figure 1:
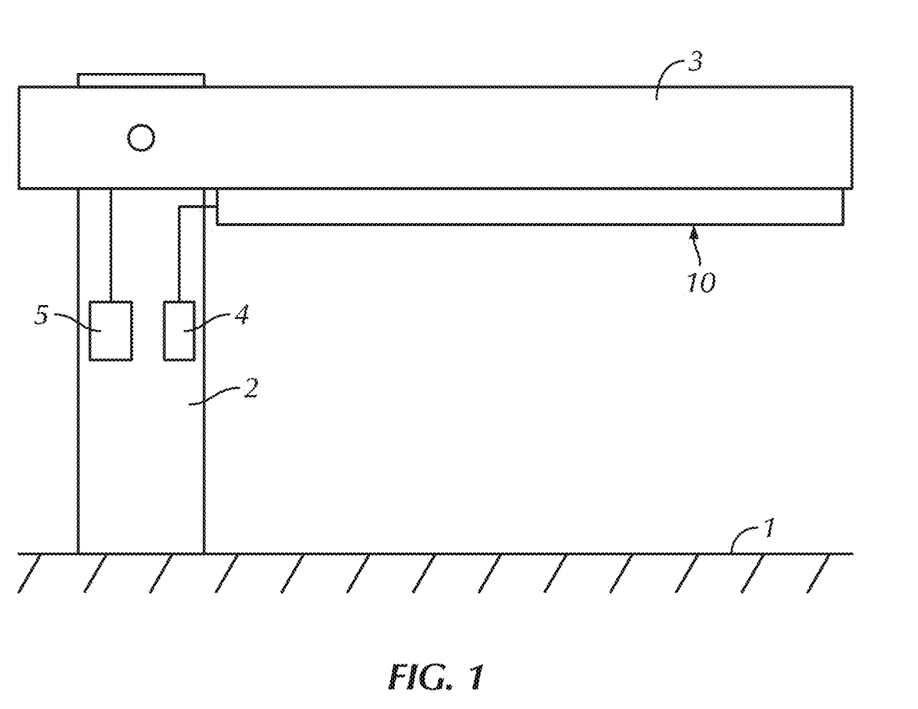
FIG. 1 is a schematic view of an illuminated sensing edge assembly mounted to a swing gate barrier system.
Figure 2:
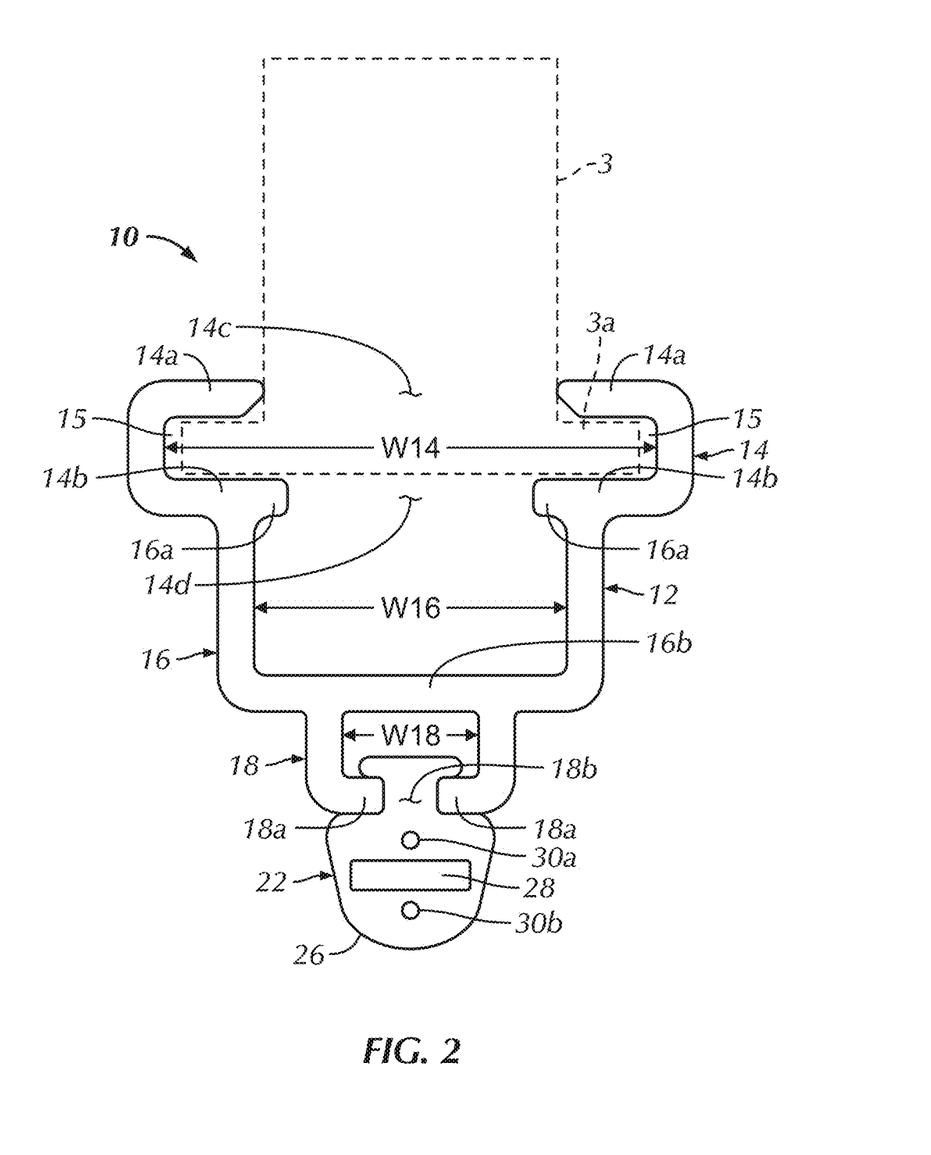
FIG. 2 is a side perspective view of an elongate body of the illuminated sensing edge assembly of the present disclosure, with a sensing edge mounted thereto.

Referring to FIG. 1, generally, swing gate barrier systems include a barrier system post 2 affixed to, and projecting upwardly from, the ground surface 1 and a barrier arm 3 (shown schematically) rotationally mounted to the barrier system post 2. The barrier arm 3 is configured to rotate (via the motor 5) between a substantially upright, open position (not shown) and a substantially horizontal, closed position.

On occasion, the barrier arms 3 make unintended contact with a vehicle or individual, potentially resulting in damage or injury. For example, a barrier arm 3 may go unnoticed, particularly when in the upright position, and may be configured with a timer to rotate downward upon completion, resulting in inadvertent collision with a vehicle or an individual.

To address this prospective hazardous occurrence, some barrier arms 3 have been equipped with an LED strip on each of a front face and a rear face of the barrier arm 3 to bring additional attention to the barrier arm 3 from either side. Additionally, or alternatively, some barrier arms 3 have been equipped with a sensing edge configured to stop rotation of the barrier arm 3 or rotate the barrier arm 3 back into the upright position upon sensing contact of the barrier arm 3 with an underlying object.

One drawback of such approaches is the added weight to the rotating barrier arm 3, especially considering the length of the arm and the added stress on the motor unit employed to rotate the barrier arm 3. Such added stress may shorten the operating life of the unit. Additionally, added weight unfavorably increases the force of the barrier arm 3 while rotating downwardly. Employing two separate LED strips and possibly also a sensing edge also further adds to the cost.

It would, therefore, be advantageous to manufacture an illuminated sensing edge assembly for a swing gate barrier system that incorporates a single LED strip and is mountable to the barrier arm in a manner that is visible from both the front and rear sides of the system.

BRIEF SUMMARY OF THE DISCLOSURE

Briefly stated, one aspect of the present disclosure is directed to an illuminated sensing edge assembly having an axially elongate, triple tiered body including a first track, a second track and a third track. The first track is configured to connect with a swing gate barrier arm such that the body underlies the barrier arm when mounted thereto. The second track is constructed of an at least translucent material. An LED strip axially extends through the second channel and is configured to emit light to notify individuals of the barrier arm. A sensing edge underlies the body and is secured to the third track. The sensing edge is configured to elicit a stoppage or reversal of a closing operation of the barrier arm upon a force being applied to the sensing edge.

Briefly stated, another aspect of the present disclosure is directed to an illuminated sensing edge assembly having an axially elongate, triple tiered body including a first track, a second track and a third track. The first track is configured to connect with a swing gate barrier arm such that the body underlies the barrier arm when mounted thereto. The second track is constructed of an at least translucent material. An LED strip axially extends through the second channel and is configured to emit light to notify individuals of the barrier arm. A sensing edge underlies the body and is secured to the third track, the sensing edge being configured to elicit a stoppage or reversal of a closing operation of the barrier arm upon a force being applied to the sensing edge. An end cap is movably attached to the body proximate an axial end of the body, the end cap including two halves hingedly connected proximate a base thereof, whereby the end cap is selectively manipulatable to diverge the two halves away from one another and converge the two halves toward one another about the hinged connection in a clamshell style. The end cap is movable between an open, mounted position, wherein the end cap forms an oblique angle with the body and the axial end of the body is at least partially exposed, and a closed, mounted position, wherein the axial end of the body is covered by the end cap.

BRIEF DESCRIPTION OF THE SEVERAL VIEWS OF THE DRAWINGS

The following description of embodiments of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the sensing edge assembly, and designated parts thereof, in accordance with the present disclosure. In describing the sensing edge assembly, the terms proximal and distal are used in relation to the user, proximal being closer to the barrier system post and distal being further from the barrier system post. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-5, an illuminated sensing edge assembly, generally designated 10, for a swing gate barrier system (FIG. 1), in accordance with an embodiment of the present disclosure. The illuminated sensing edge assembly 10 includes an axially elongate assembly body 12. In the illustrated embodiment, the elongate body 12 is triple tiered, having a first or upper track/channel 14, overlying a second or middle track/channel 16, overlying a third or base track/channel 18. In the illustrated embodiment, the assembly body 12 is a monolithic structure, i.e., formed as a single, integral and unitary structure, but the disclosure is not so limited.

The illuminated sensing edge assembly 10 is configured to mount/clip onto a barrier arm 3 of a swing gate barrier system via the first track 14. As should be understood, the barrier arm 3 is shown schematically in the figures and is intended to encompass different styles and types of barrier arms. The first track 14 may be modified to complement a particular style and type of barrier arm. In the illustrated embodiment, the first track 14 defines a widest lateral extent W14 (in a direction perpendicular to the axial extent and perpendicular to the elevational extent) of the body 12. The first track 14 is configured to axially receive a base portion (or a mounting assembly) of a barrier arm 3 therethrough, such that the illuminated sensing edge assembly 10 underlies the barrier arm 3 when mounted thereto. As shown, the first track 14 includes a pair of parallel and laterally spaced apart, axially extending upper surfaces 14a as well as a pair of elevationally spaced, parallel and laterally spaced apart, axially extending, lower surfaces 14b. The pair of upper surfaces 14a define an axially extending, central upper void 14c therebetween. In the illustrated embodiment, the pair of lower surfaces 14b also define an axially extending, central lower void 14d therebetween, but the disclosure is not so limited. The upper and lower pairs of surfaces 14a, 14b define laterally spaced apart generally U-shaped mounting ledges 15 (in a cross-section defined by the elevational and lateral planes) in facing relation with one another, configured to axially receive, for example, an inverted T-shaped mounting structure 3a of the barrier arm 3.

The second track/channel 16, underlying the first track 14, is generally rectangular in cross-section (defined by the elevational and lateral planes). In the illustrated embodiment, the second track/channel 16 defines a narrower lateral extent W16 (in a direction perpendicular to the axial extent and perpendicular to the elevational extent) than the lateral extent W14 of the first track 14, but the disclosure is not so limited. The axially extending, central lower void 14d also forms a continuous cavity between the first track 14 and the second track/channel 16, but the disclosure is not so limited.

Figure 3:
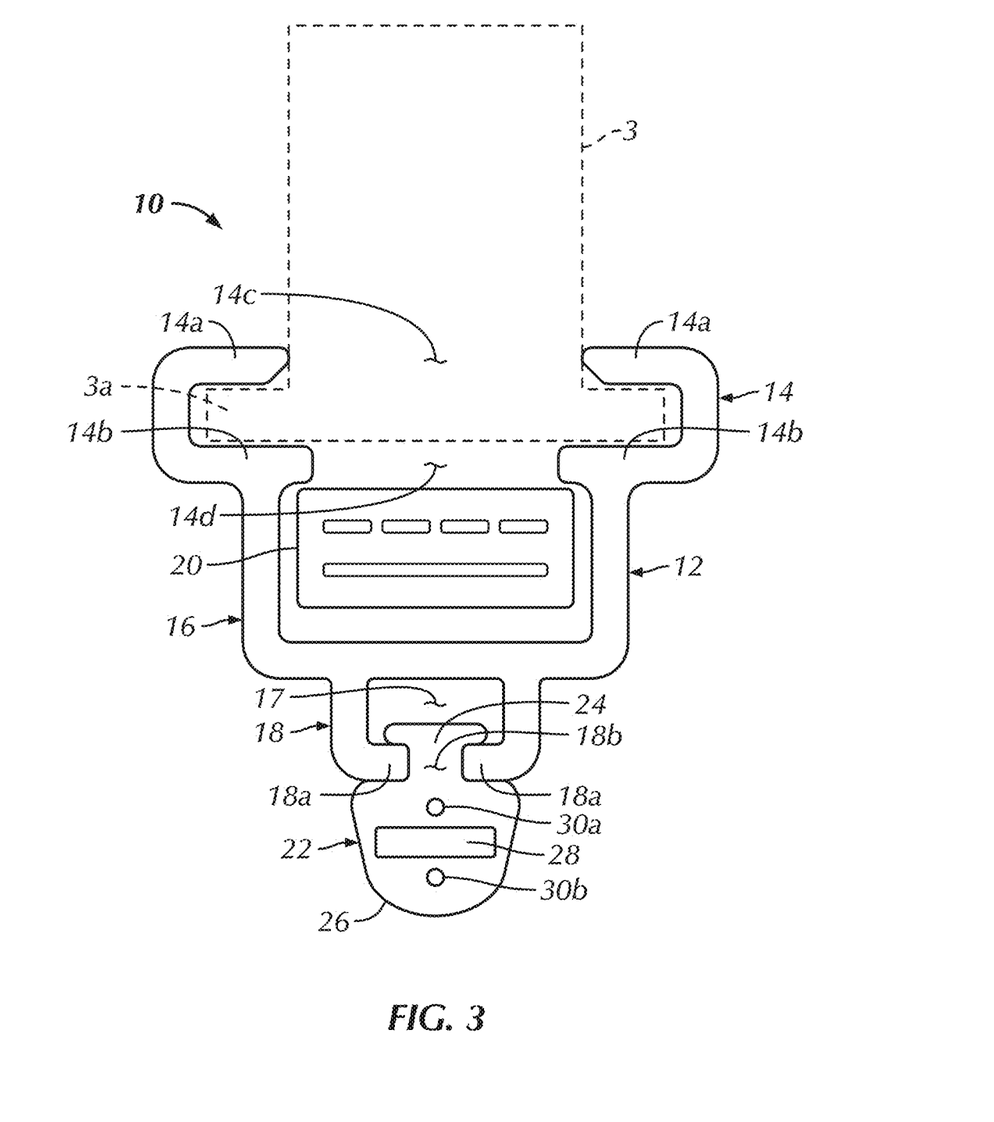
FIG. 3 is another side perspective view of the elongate body of the illuminated sensing edge assembly of the present disclosure, with an LED strip and the sensing edge mounted thereto.
Figure 4:
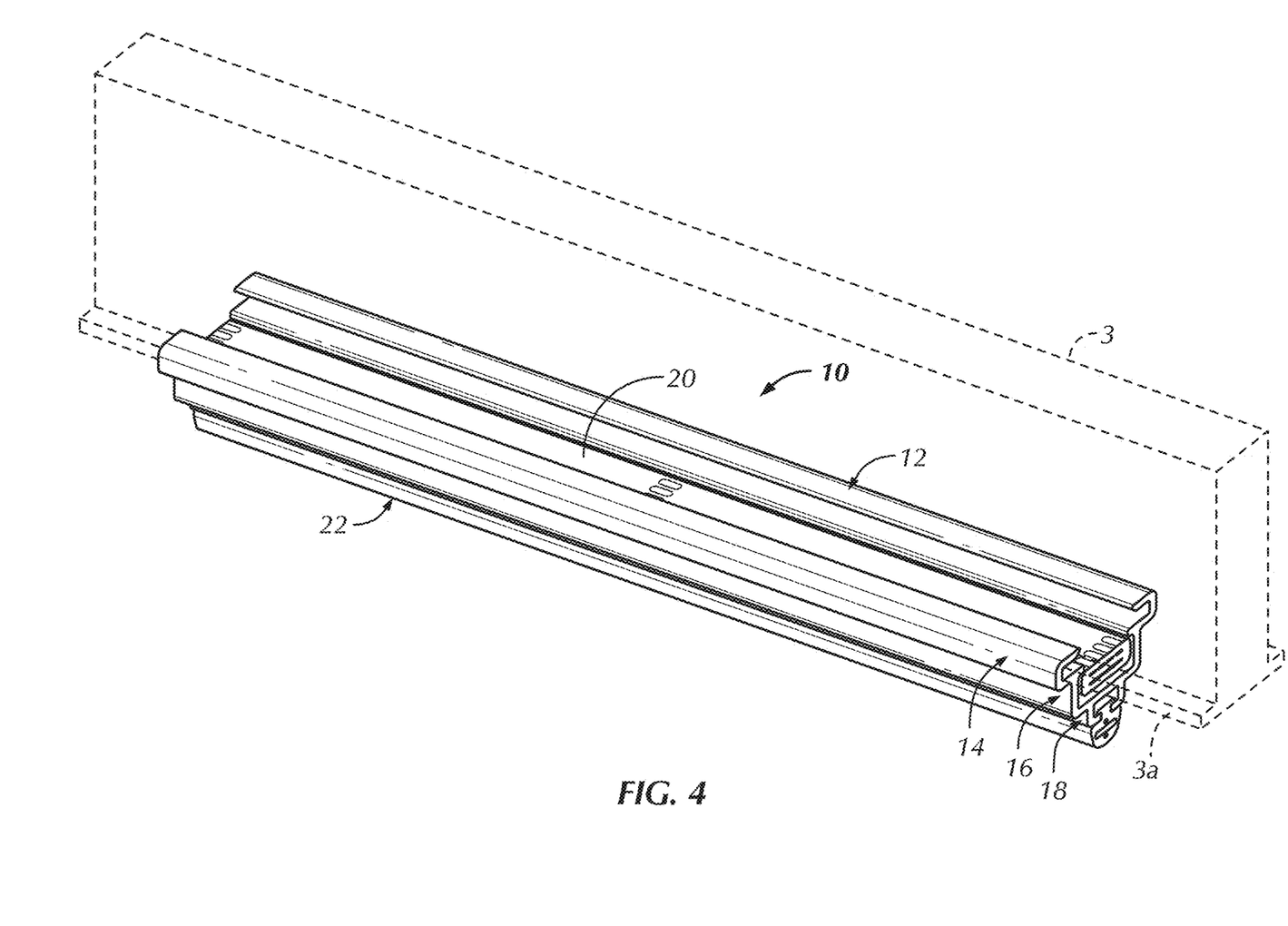
FIG. 4 is a top and front perspective view of the illuminated sensing edge assembly of FIG. 3.
Figure 5:
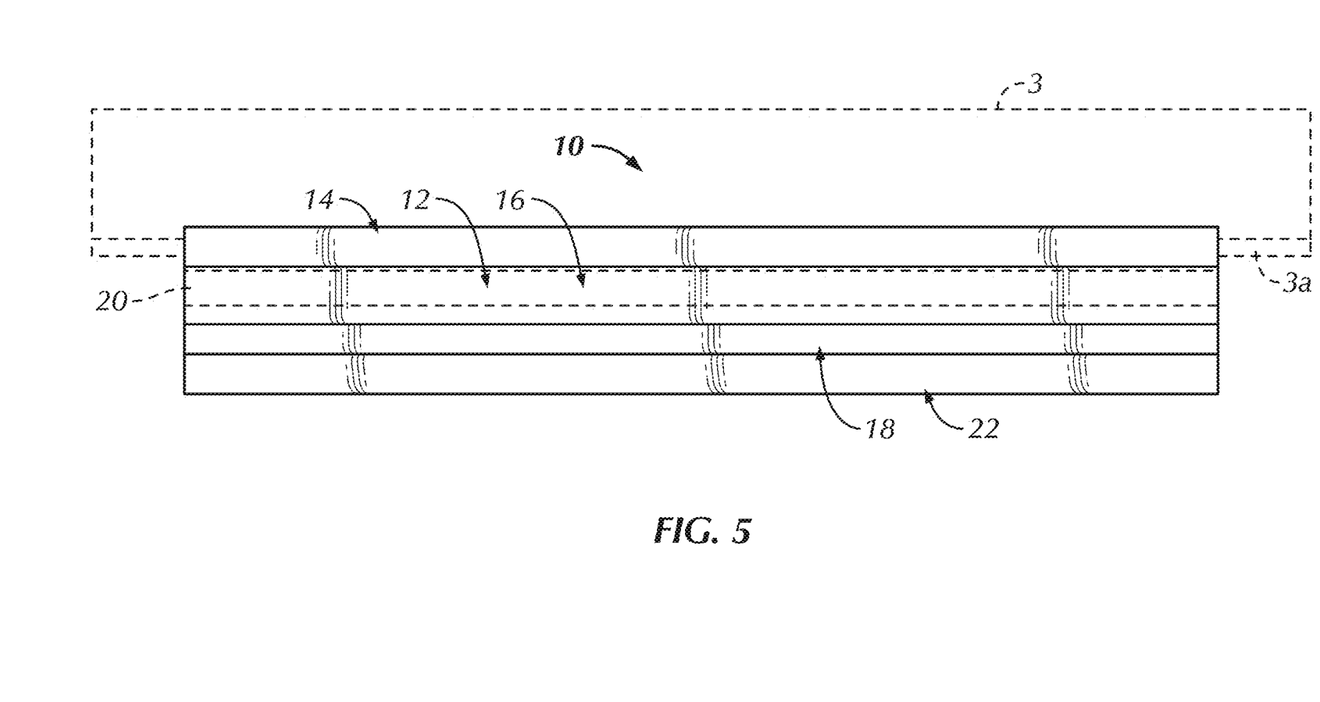
FIG. 5 is a front elevational view of the illuminated sensing edge assembly of FIG. 3.

As shown best in FIGS. 3-5, an elongate single LED strip 20 axially extends through the second channel 16. In the illustrated embodiment, the second channel 16 includes a continuous base surface 16b and a pair of axially extending, upper ledges 16a bounding the axially extending, central lower void 14d. As shown best in FIGS. 3 and 4, the LED strip 20 is stabilized between the base surface 16b and the ledges 16a. As should be understood, however, the LED strip 20 may additionally or alternatively be stabilized within the second channel 16 via numerous means currently known or that later become known, such as by an adhesive.

The LED strip 20 is electrically connected with a controller 4 (FIG. 1), e.g., installed within the barrier system post 2 and a power source (not shown). In one configuration, the controller 4 may be configured to have the LED strip 20 emit light having a first color, e.g., green, when the barrier arm 3 is in the fully open, i.e., upright, position, and emit light having a different, second color, e.g., red, whenever the barrier arm 3 is not in the fully open position, i.e., in the fully closed (horizontal or parallel to the underlying ground surface) position or any position other than fully open position. Alternatively, the controller 4 may be configured to have the LED strip 20 emit light having a first color when the barrier arm 3 is in the fully open position, emit a different, emit light having second color when the barrier arm 3 is in the fully closed position, and emit light having a different, third color, e.g., yellow, when the barrier arm 3 is positioned anywhere in between the fully closed and fully open positions. Advantageously, mounting the illuminated sensing edge assembly 10 to an underside of the barrier arm 3 allows visibility of the LED strip 20 from both the front and rear of the barrier arm 3. That is, the barrier arm 3 does not, itself, obscure the emittance of the LED strip 20 from the front or rear thereof. Accordingly, only a single LED strip 20 is required to bring the barrier arm 3, and particularly the position thereof, to the attention of individuals on either the front side or the rear side of the barrier arm 3.

To maximize emittance of the LED strip 20, the elongate body 12 may advantageously be constructed of an at least translucent (which includes substantially transparent) material. For example, the elongate body 12 may be constructed of a clear vinyl material. The elongate material may also advantageously be constructed of a material having UV inhibitor(s) to mitigate premature degradation of the material (e.g., yellowing or reduction in clarity) due to UV light exposure. As one example, the elongate body 12 may be constructed of Rimtec 43006 UV Clear manufactured by Rimtec Corporation.

Referring again to FIGS. 2 and 3, the third or base track/channel 18, underlying the second channel 16, is also generally rectangular in cross-section (defined by the elevational and lateral planes). In the illustrated embodiment, the base track/channel 18 defines the narrowest lateral extent W18 (in a direction perpendicular to the axial extent and perpendicular to the elevational extent) of the body 12, but the disclosure is not so limited. The base track/channel 18 is configured to secure a sensing edge 22 thereto, such as, for example, as disclosed in U.S. Pat. No. 5,225,640, the entire contents of which are incorporated by reference herein. In the illustrated embodiment, the base track 18 includes a pair of parallel and laterally spaced apart, axially extending, base ledges 18*a*, elevationally spaced from the base surface 16*b* of the second channel 16 and defining an axially elongate cavity 17 therebetween. The pair of base ledges 18*a* define an axially extending, central base void 18*b* therebetween, i.e., an axially elongate opening to the cavity 17. The axially extending, central base void 18*b*, in combination with the pair of base ledges 18*a*, is configured to support an axially elongate, T-shaped (in a cross-section defined by the elevational and lateral planes) mounting member 24 projecting upwardly from the sensing edge 22, thereby attaching the sensing edge 22 to elongate body 12. As should be understood, however, the sensing edge 22 may additionally or alternatively be secured to the elongate body 12 via any other suitable manner.

As should be understood by those of ordinary skill in the art, the sensing edge 22 is configured at least to halt or reverse a closing operation of the barrier arm 3 upon a force being applied to the sensing edge 22. The sensing edge 22 includes an axially elongate sheath 26 underlying the mounting member 24. In the illustrated embodiment, the mounting member 24 and the sheath 26 are monolithic, but the disclosure is not so limited. In one non-limiting configuration, the mounting member 24 and the sheath 26 may be constructed of a form-retaining but flexible material, such as an elastomeric material (e.g., rubber).

The sheath 26 defines an internal, axially elongate cavity 28, which is compressible upon application of an external force. Axially extending within the elongate cavity 28 are two spaced apart electrically conductive members 30*a*, 30*b*, e.g., electrically conductive polymers, which operate as two opposing electrical contacts of a circuit (not shown) connected with the controller 4. In their normal orientation, when the sheath 26 is uncompressed, the circuit is open/disconnected. Upon sufficient compression of the sheath 26, e.g., upon contact with an object, which causes the two electrically conductive members 30*a*, 30*b* to make contact with one another, the circuit is closed/connected, whereby the controller 4 is actuated and configured to halt or reverse a closing operation of the barrier arm 3 (e.g., via a motor 5). The LED strip 20 can also change colors or flash intermittently upon contact with the sheath 26

Turning to FIGS. 6-11, the sensing edge assembly 10 may further include a respective end cap 32 connected to each axial end of the elongate body 12. In one configuration, the end cap 32 is generally U-shaped in cross-section (defined by the elevational and lateral planes), but the disclosure is not so limited. In one configuration, the end cap 32 also defines a first axial section 37*a* adjacent a second axial section 37*b*. In the illustrated configuration, the first axial section 37*a* is narrower than the second axial section 37*b*, but the disclosure is not so limited. As should be understood, the end cap 32 may be formed of a single axial section or more than two axial sections of equal or varying thickness.

The end cap 32 also defines two halves 32*a*, 32*b* in facing engagement with one another and defining a cavity 32*c* therebetween. The two halves 32*a*, 32*b* define a closed rear end 37*c* (relative to the elongate body 12) and are connected at a base thereof by an axially extending living hinge 33 therebetween, thereby defining base and rear walls for the cavity 32*c*. Conversely, as shown best in FIG. 7, the cavity 32*c* has open front and top ends. The living hinge 33 enables the end cap 32 to be selectively opened and closed in a clamshell style, i.e., enabling the halves 32*a*, 32*b* to diverge away from one another and converge toward one another about the hinge 33. Alternatively, the two halves 32*a*, 32*b* of the end cap 32 may be connected by other hinge types currently known or that later become known. Further alternatively, the end cap 32 may be constructed of a material having sufficient flexibility to permit the two halves 32*a*, 32*b* to flex toward and away from one another as required to mount the end cap 32 onto the elongate body 12 without the presence of a hinge. In one configuration, the end cap 32 is constructed of a polymeric material, e.g., polypropylene, but the disclosure is not so limited.

Each end cap 32 is movably attached to the elongate body 12 proximate an axial end thereof. The end cap 32 is configured to complement the external cross-sectional footprint of the elongate body 12 and the attached sensing edge 22 underlying the elongate body 12. Accordingly, the end cap 32 is also generally triple tiered, having a first or top level 34*a*, overlying a second or middle level 34*b*, overlying a third or bottom level 34*c*. The cavity 32*c* defines the interior of the first, second and third levels 34*a*, 34*b*, 34*c*. In the fully mounted state of the end cap 32 (FIGS. 10, 11), i.e., a closed, mounted position, the first level 34*a* generally elevationally aligns with the first track 14, the second level 34*b* generally elevationally aligns with the second track 16, and the third level 34*c* generally elevationally aligns with both the third track 18 and the sensing edge 22. In the fully mounted state of the end cap 32, the axial ends of the elongate body 12 and the sensing edge 22 are received within, and covered by, the internal cavity 32*c*.

Figure 6:
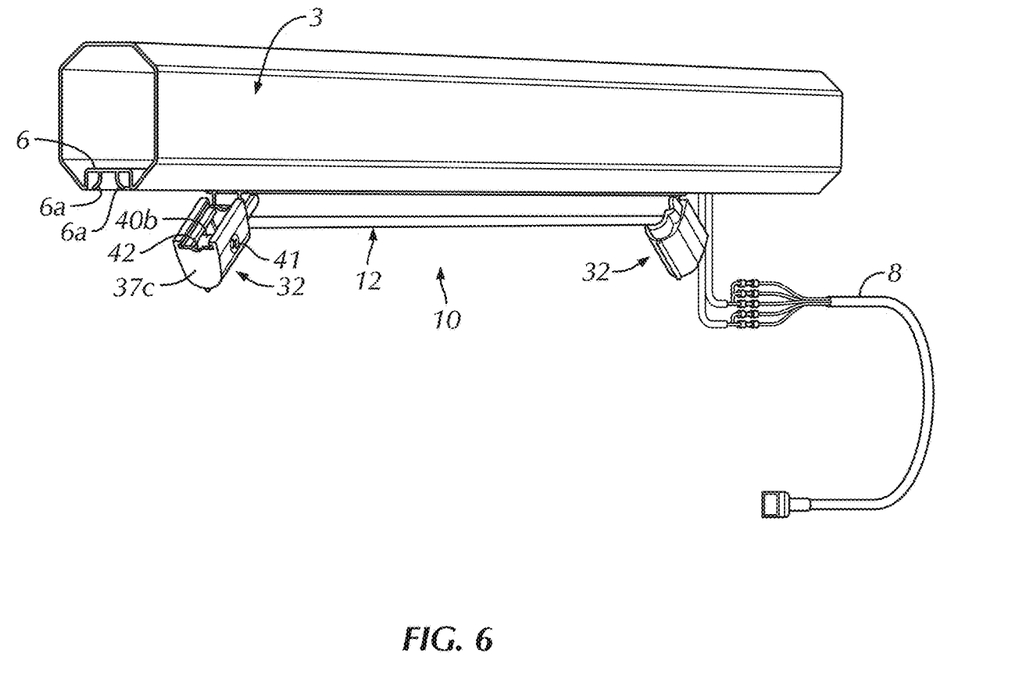
FIG. 6 is a front and end perspective view of the illuminated sensing edge assembly of FIG. 3 having end caps mounted thereto in an open, mounted position, the sensing edge assembly and the end caps being mounted to a barrier arm of a swing gate barrier system.

As shown, the end cap 32 includes a pair of axially extending ledges/fingers 35 each having a laterally inwardly projecting peg 36, i.e., the two pegs 36 projecting toward one another. The pegs 36 are configured to engage corresponding apertures (not shown) in the elongate body 12 to pivotably attach the end cap 32 to the elongate body 12. Generally, to mount the end cap 32 onto the elongate body 12, the halves 32*a*, 32*b* of the end cap 32 may be opened/diverged as necessary about the hinge 33 and the end cap 32 is positioned upon an axial end of the elongate body 12 and sensing edge 22 and the end cap 32 is subsequently clamped to engage the pegs 36 with the corresponding apertures formed in the elongate body 12. In the illustrated configuration, the ledges 35 axially project from the second level 34*b*, and, therefore, the corresponding apertures in the elongate body 12 are formed in the opposing sidewalls of the second track 16, but the disclosure is not so limited. The end cap 32 is, therefore, pivotable relative to the elongate body 12 between an open, mounted position (FIGS. 6, 9), wherein the end cap 32 is mounted to the elongate body 12 and forms an oblique angle therewith, and the closed, mounted position. As shown best in FIG. 9, the axial end of the elongate body 12 remains at least partially exposed in the open, mounted position of the end cap 32, whereas the axial end of the elongate body 12 is covered by the end cap 32 in the closed, mounted position (FIGS. 10, 11). Advantageously, as shown in FIG. 6, two end caps 32 may be attached to the elongate body 12 as a component of the illuminated sensing edge assembly 10 during assembly thereof and the ends caps 32 may be maintained in the open, mounted position prior to engagement of the assembly 10 with a swing gate barrier system. The assembly 10 may, therefore, be transported to the user/consumer with the end caps 32 pre-attached.

Figure 7:
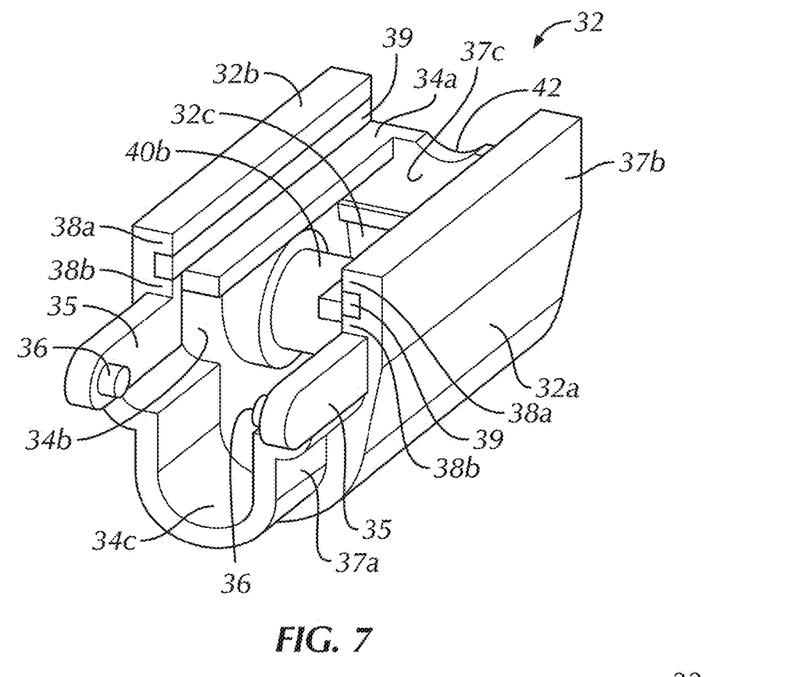
FIG. 7 is a top perspective view of the end cap of FIG. 6.
Figure 8:
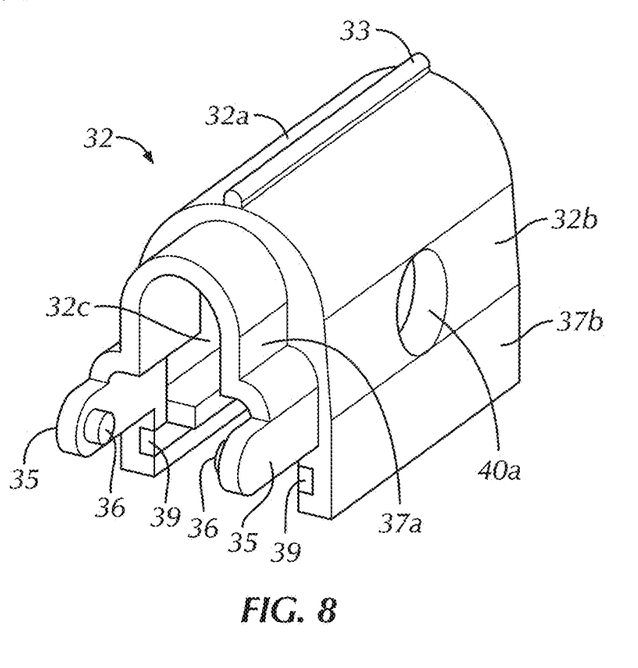
FIG. 8 is a bottom perspective view of the end cap of FIG. 6.

As shown best in FIGS. 7 and 10, and similarly to the first track 14 of the elongate body 14, the first level 34a of the end cap 32 includes a pair of parallel and laterally spaced apart, axially extending upper surfaces 38a as well as a pair of elevationally spaced, parallel and laterally spaced apart, axially extending, lower surfaces 38b. The void between the upper surfaces 38a defines the open top of the cavity 32c. The upper and lower pairs of surfaces 38a, 38b also define laterally spaced apart channels therebetween. An axially extending polymeric, e.g., elastomeric, strip 39 is fitted within each channel. In one configuration, the polymeric strip 39 may be constructed of Santoprene, but the disclosure is not so limited.

In one configuration, as previously described, the barrier arm 3 may define an inverted T-shaped mounting structure 3a. In such a configuration, after mounting of the sensing edge assembly 10 to the barrier arm 3 (as previously described), and with the halves 32a, 32b sufficiently diverged from one another about the hinge 33, the end cap 32 may be pivoted from the open, mounted position thereof to the close position thereof, wherein the inverted T-shaped mounting structure 3a is received within the first level 34a and positioned between the polymeric strips 39. Subsequently, the halves 32a, 32b may be sufficiently fastened with one another to form a press-fit between the strips 39 and the mounting structure 3a therebetween to fix the end cap 32 to the barrier arm 3 (FIGS. 10, 11). As shown, the one of the halves 32a, 32b may include an aperture 40a and the other of the halves 32a, 32b may include a threaded post 40b aligned with the aperture 40a. A fastener 41 may be inserted through the aperture 40a and threadedly engaged with the threaded post 40b and sufficiently tightened. As should be understood by those of ordinary skill in the art, however, the first and second halves 32a, 32b may be selectively tightened together or loosed apart via any of numerous means currently known, or that later become known, capable of functioning in like manner as described herein.

Figure 9:
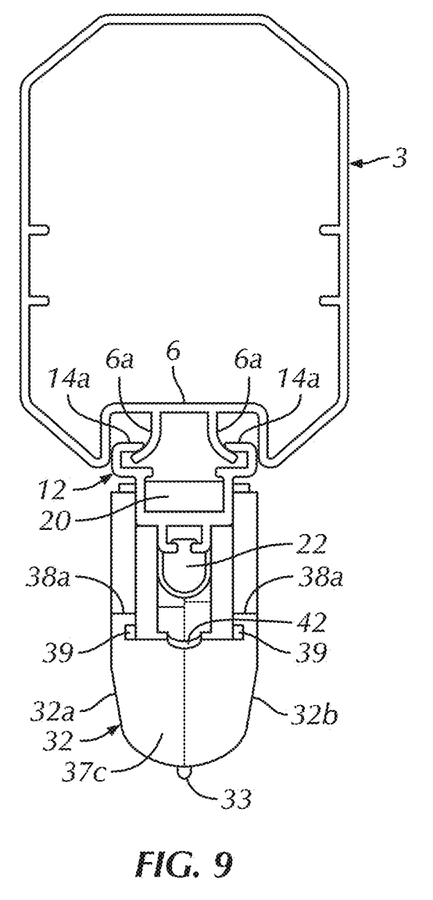
FIG. 9 is a front elevational view of the barrier arm, the illuminated sensing edge assembly and the end cap of FIG. 3, with the end cap in the open, mounted position.
Figure 10:
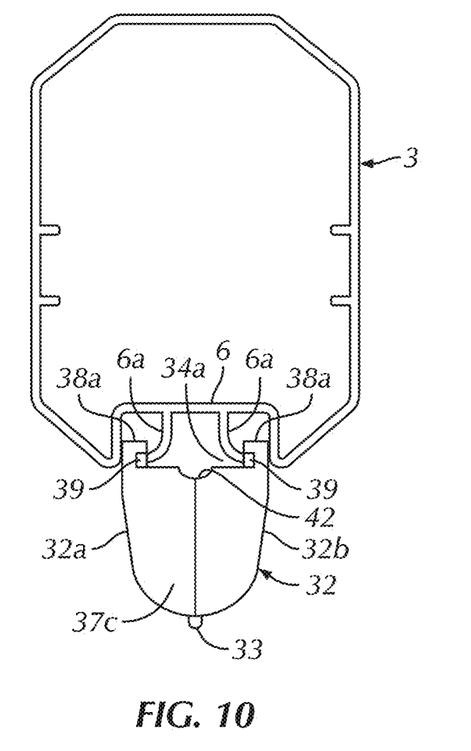
FIG. 10 is a front elevational view of the barrier arm, the illuminated sensing edge assembly and the end cap of FIG. 3, with the end cap in a closed, mounted position.
Figure 11:
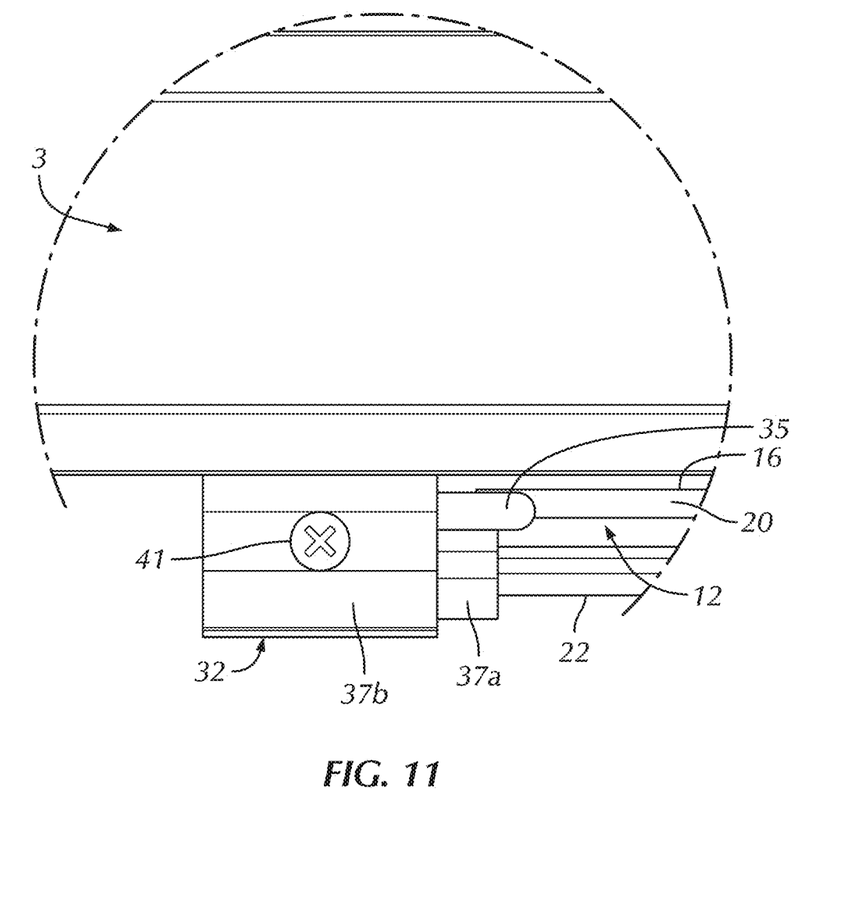
FIG. 11 is a partial, side elevational view of the end cap of FIG. 6 in the closed, mounted position.

As shown in FIGS. 6, 9 and 10, the barrier arm 3 may alternatively define an axially elongate mounting channel 6, open at the base end thereof. As shown, the mounting channel 6 may define a generally rectangular shape in cross-section (defined by the elevational and lateral planes), but the disclosure is not so limited. A pair of oppositely facing, generally hook-shaped, axially extending ledges 6a project downwardly within the mounting channel 6. Each mounting ledge 15 of the elongate body 12 is configured to axially receive, i.e., in a slidable manner, a corresponding hook-shaped ledge 6a of the barrier arm 3.

Thereafter, with the halves 32a, 32b sufficiently diverged from one another about the hinge 33, the end cap is 32 is pivoted from the open, mounted position into the closed, mounted position, i.e., into engagement with the generally hook-shaped ledges 6a. The laterally spaced apart upper surfaces 38a are each dimensioned to advance through a lateral opening between a corresponding hook-shaped ledge 6a and a corresponding sidewall of the mounting channel 6. The end cap 32 is subsequently pivoted into the closed, mounted position thereof and sufficiently fastened with one another to form a press-fit between the strips 39 and the mounting structure hook-shapes ledges 6a therebetween to fix the end cap 32 to the barrier arm 3 (as previously described).

As shown in FIGS. 6, 7, 9, and 10, the end cap 32 also defines an arcuate recess 42 along a top edge of the closed rear end 37c. As previously described, the LED strip 20 and the sensing edge 22 are electrically connected with the controller 4. Advantageously, the cavity 32c and the recess 42 operate as a cradle for the wires 8 extending from the LED strip 20 and the sensing edge 22, thereby alleviating gravitationally induced and/or motion induced strain on the wires 8, particularly at the junction between the wires 8 and the LED strip 20 and the sensing edge 22.

It will be appreciated by those skilled in the art that changes could be made to the embodiment(s) described above without departing from the broad inventive concept thereof. It is understood, therefore, that this disclosure is not limited to the particular embodiments disclosed, but it is intended to cover modifications within the spirit and scope of the present disclosure as defined by the present description, and as set forth in the appended claims.

We claim:

1. An illuminated sensing edge assembly comprising:
an axially elongate, triple tiered body including a first track, a second track and a third track, the first track being configured to connect with a swing gate barrier arm such that the body underlies the barrier arm when mounted thereto, and the second track being constructed of an at least translucent material;
an LED strip axially extending through the second track and configured to emit light to notify individuals of the barrier arm; and
a sensing edge underlying the body and secured to the third track, the sensing edge being configured to elicit a stoppage or reversal of a closing operation of the barrier arm upon a force being applied to the sensing edge.

2. The illuminated sensing edge of claim 1, wherein the first track defines a widest lateral extent of the body in a direction perpendicular to an axial extent of the body and perpendicular to an elevational extent of the body.

3. The illuminated sensing edge of claim 1, wherein the first track is configured to slidably receive a portion of the barrier arm therethrough.

4. The illuminated sensing edge of claim 1, wherein the first track includes a pair of parallel and laterally spaced apart, axially extending upper surfaces as well as a pair of elevationally spaced, parallel and laterally spaced apart, axially extending, lower surfaces, the pair of upper surfaces defining an axially extending, central upper void therebetween, and the pair of upper surfaces in conjunction with the pair of lower surfaces defining two laterally spaced apart generally U-shaped mounting ledges in facing relation with one another, the two mounting ledges each configured to axially receive a portion of the barrier arm.

5. The illuminated sensing edge of claim 4, wherein the pair of lower surfaces define an axially extending, central lower void therebetween.

6. The illuminated sensing edge of claim 5, wherein the central lower void forms a continuous cavity between the first track and the second track.

7. The illuminated sensing edge of claim 1, wherein the second track defines a narrower lateral extent than a lateral extent of the first track in a direction perpendicular to an axial extent of the body and perpendicular to an elevational extent of the body.

8. The illuminated sensing edge of claim 1, wherein the LED strip is operatively connected with a controller, the controller being configured to activate the LED strip to at least one of (i) emit light having a first color when the barrier arm is in a fully open position, (ii) emit light having a second color when the barrier arm is in a fully closed position, or (iii) emit light having a third color when the barrier arm is positioned between the fully open position and the fully closed position.

9. The illuminated sensing edge of claim 1, wherein the body is constructed of a substantially transparent material.

10. The illuminated sensing edge of claim 1, wherein the third track defines a narrowest lateral extent of the body in a direction perpendicular to an axial extent of the body and perpendicular to an elevational extent of the body.

11. The illuminated sensing edge of claim 1, wherein the third track includes a pair of parallel and laterally spaced apart, axially extending, base ledges elevationally spaced from a base surface of the second track and defining an axially elongate cavity, the pair of base ledges defining an axially extending, central base void therebetween.

12. An illuminated sensing edge assembly comprising:
   an axially elongate, triple tiered body including a first track, a second track and a third track, the first track being configured to connect with a swing gate barrier arm such that the body underlies the barrier arm when mounted thereto, and the second track being constructed of an at least translucent material;
   an LED strip axially extending through the second track and configured to emit light to notify individuals of the barrier arm;
   a sensing edge underlying the body and secured to the third track, the sensing edge being configured to elicit a stoppage or reversal of a closing operation of the barrier arm upon a force being applied to the sensing edge; and
   an end cap movably attached to the body proximate an axial end of the body, the end cap including two halves hingedly connected proximate a base thereof, whereby the end cap is selectively manipulatable to diverge the two halves away from one another and converge the two halves toward one another about the hinged connection in a clamshell style, the end cap being movable between an open, mounted position, wherein the end cap forms an oblique angle with the body and the axial end of the body is at least partially exposed, and a closed, mounted position, wherein the axial end of the body is covered by the end cap.

13. The illuminated sensing edge assembly of claim 12, wherein the two halves are hingedly connected via a living hinge.

14. The illuminated sensing edge assembly of claim 12, wherein the end cap is configured to complement an external cross-sectional footprint of the body and the sensing edge secured to the body, the end cap being tripled tiered and defining a first level, a second level and a third level, wherein in the closed, mounted position, the first level elevationally aligns with the first track, the second level elevationally aligns with the second track and the third level elevationally aligns with both the third track and the sensing edge.

15. The illuminated sensing edge assembly of claim 14, wherein the first level includes a pair of parallel and laterally spaced apart, axially extending upper surfaces as well as a pair of elevationally spaced, parallel and laterally spaced apart, axially extending, lower surfaces, the pair of upper surfaces in conjunction with the pair of lower surfaces defining two laterally spaced apart channels therebetween, and an axially extending polymeric strip received within each of the two channels.

16. The illuminated sensing edge assembly of claim 14, wherein the first level is configured to engage the swing gate barrier arm in the closed, mounted position.

17. The illuminated sensing edge assembly of claim 12, wherein the two halves of the end cap define a cavity therebetween, the axial end of the body being received within the cavity in the closed, mounted position.

18. The illuminated sensing edge assembly of claim 12, wherein the end cap is pivotably mounted to the body.

19. The illuminated sensing edge assembly of claim 18, wherein the end cap includes a pair of fingers, each finger projecting from a corresponding half of the end cap and each finger having a laterally inwardly projecting peg, wherein each peg projects toward the other, each peg being configured to engage a corresponding aperture in the body to pivotably attach the end cap to the body.

20. The illuminated sensing edge assembly of claim 12, wherein the end cap further comprises a fastener configured to selectively fasten the two halves together in a stationary manner.

* * * * *